United States Patent [19]

Imsand et al.

[11] Patent Number: 4,910,685

[45] Date of Patent: Mar. 20, 1990

[54] VIDEO CIRCUIT INCLUDING A DIGITAL-TO-ANALOG CONVERTER IN THE MONITOR WHICH CONVERTS THE DIGITAL DATA TO ANALOG CURRENTS BEFORE CONVERSION TO ANALOG VOLTAGES

[75] Inventors: Bruce E. Imsand, Huntsville; Christopher L. Thomas, Harvest, both of Ala.

[73] Assignee: Intergraph Corporation, Huntsville, Ala.

[21] Appl. No.: 530,607

[22] Filed: Sep. 9, 1983

[51] Int. Cl.⁴ ............ G06F 15/40

[52] U.S. Cl. ............ 364/518; 340/721; 364/521; 358/11; 358/13; 375/27

[58] Field of Search ............ 364/518, 521; 358/11, 358/13; 340/721, 750, 744, 747, 722, 728; 375/27

[56] References Cited

U.S. PATENT DOCUMENTS

| | | | |
|---|---|---|---|
| 3,098,219 | 7/1963 | Voigt et al. | 340/722 |
| 3,609,552 | 9/1971 | Limb et al. | 375/27 |
| 3,617,626 | 11/1971 | Bluth . | |
| 3,952,297 | 4/1976 | Stauffer et al. . | |
| 4,015,286 | 2/1977 | Russell . | |
| 4,030,119 | 6/1977 | Ellis | 358/11 |
| 4,107,780 | 8/1978 | Grimsdale et al. | 340/750 |
| 4,259,725 | 3/1981 | Andrews et al. | 364/521 |
| 4,303,912 | 12/1981 | Stafford et al. | 358/13 |
| 4,317,114 | 2/1982 | Walker | 340/721 |
| 4,371,872 | 2/1983 | Rossman | 340/721 |
| 4,439,762 | 5/1984 | Van Vliet et al. | 340/728 |
| 4,470,042 | 9/1984 | Barnich et al. | 340/721 |
| 4,471,348 | 9/1984 | London et al. | 340/722 |
| 4,490,797 | 12/1984 | Staggs et al. | 340/721 |
| 4,509,043 | 4/1985 | Mossaides | 340/721 |

OTHER PUBLICATIONS

Analog-Digital Conversion Handbook, edited by D. H. Sheingold, published by Analog Devices, Inc., Norwood, Mass., Jun. 1972, pp. I-42 to I45, I-64, 65; II-36 to II-45; II-4, 5.

Transistor Manual, edited by J. F. Cleary, published by General Electric Company, Syracuse, N.Y., Aug. 69, pp. 370, 371.

The Engineering Staff of Analog Devices, Inc., Analog-Digital Conversion Handbook, Jun. 1972.

*Primary Examiner*—Parshotam S. Lall
*Attorney, Agent, or Firm*—Cushman, Darby & Cushman

[57] ABSTRACT

A system for processing video data to be displayed comprises a controller and a monitor. The controller includes a memory for storing the digital data to be displayed and apparatus for sequentially reading data from the memory. The data from the controller is conducted in digital form to the separately housed monitor separated from the controller. In the monitor, the digital data is converted into analog form and displayed. In the converting process, the digital data is first converted to an analog current and then the analog current is converted to a voltage. An additional voltage-to-voltage conversion may occur to isolate the capacitance of the display device. This system is particularly suited for high resolution systems (greater than 1000×1000 pixels) in which a new pixel is refreshed at least every 10 nanoseconds.

10 Claims, 3 Drawing Sheets

VIDEO CIRCUIT INCLUDING A DIGITAL-TO-ANALOG CONVERTER IN THE MONITOR WHICH CONVERTS THE DIGITAL DATA TO ANALOG CURRENTS BEFORE CONVERSION TO ANALOG VOLTAGES

BACKGROUND OF THE INVENTION

1. Field of the Invention

The present invention relates to the processing of video data to be displayed. More particularly, the present invention relates to displaying video data stored in a memory in digital form.

2. Description of the Prior Art

As digital data processing has become more widespread and sophisticated, the need for displaying digital data in a more sophisticated manner has also increased. In this regard, the capability for displaying in color has been added and resolution has increased.

In data processing systems having a color capability, data to be displayed may be stored in an image memory in a display controller. Typically, each pixel to be displayed is represented by 8 bits of data in the memory. These 8 bits of data must eventually be employed to control the intensity level of the three electron guns (red, green and blue) in a cathode ray tube. If the 8 bits of data were used directly to control the guns, relatively little resolution would be possible with respect to the intensity level of each gun.

To overcome this problem, typically the display controller includes a video lookup table for each gun, each of which is addressed by the 8 bits from the image memory and may, typically, produce an output of 8 bits. These output bits are employed to control the corresponding gun of the cathode ray tube. Thus, with 8 bits of data, each gun is capable of being controlled to any one of 256 levels of intensity. With three video lookup tables each addressed by 8 bits, the capability exists to produce 16.8 million different combinations of intensity levels with the three electron guns. However, since the video lookup tables are addressed by only 8 bits, only 256 of these 16.8 million possible combinations are defined at the discretion of the video lookup table programmer.

The output of the video lookup tables are applied to a digital-to-analog converter which generates a voltage signal related to the digital output of the video lookup tables. These voltage signals are then transmitted from the display controller to the monitor where they are amplified and employed to drive the guns of the cathode ray tube.

As suggested above, data is transmitted from the controller to the monitor in the form of an analog voltage. In fact, interface standard RS-343A controls the nature of the signal sent to the monitor. This standard sets the maximum peak-to-peak voltage at 1 volt. With the standard, manufacturers are able to produce monitors which can be used with any display controller.

Thus, U.S. Pat. Nos. 4,107,780, 4,015,286 and 3,617,626 all teach display systems in which digital data is converted to analog form before being sent from a display controller to the display monitor. U.S. Pat. No. 4,317,114 to Walker teaches a display system in which data initially appears in digital form which is then converted to analog form. However, no indication is made as to the nature of the data transmitted from the controller to the monitor.

SUMMARY OF THE INVENTION

However, a problem exists with this prior art system, particularly when high resolution monitors are being employed. As the resolution of a monitor increases, the amount of data that must be transmitted from the controller to the monitor increases. If the refreshing of each pixel is to be maintained at approximately the same frequency to avoid the appearance of flickering, the speed at which data must be transmitted increases. The transmission of a 1 volt peak-to-peak signal as specified by the RS-343A interface standard is difficult at a high rate of data transmission. A coaxial cable tends to act as a low pass filter. Thus, high frequency analog data signals tend be significantly attenuated. Problems also exist with respect to terminating the transmission line. Unless termination is performed with extreme accuracy, reflections occur. If 8 bits of data are provided to control each gun, then 256 different analog levels can be created for each gun. With a 1 volt peak-to-peak signal, the analog signal will vary by 3.9 millivolts per level. The reflections from an improperly terminated line and any other interference, such as stray coupling to the line, will overwhelm the fine gradations between levels.

These problems are overcome in the present invention by performing the digital-to-analog converting process in the monitor, rather than in the controller. Thus, digital signals are transmitted from the controller to the monitor. To minimize the time necessary to convert the digital data to analog data, the digital data is first converted to an analog current. Then, the analog current is converted to an analog voltage. In fact, in the preferred embodiment, the output of the current-to-voltage converter is further buffered by a low impedance output stage so that the relatively high capacitance of the cathode ray tube is isolated from the current-to-voltage converter.

Although it is known to convert digital signals to analog currents before conversion to analog voltages (see Sheingold, Daniel H., *Analog-Digital Conversion Handbook* (Analog Devices, Inc. 1972, pp. II-32-II-45)), it appears that the present inventors are the first to recognize the advantages of such a conversion approach for high resolution video display systems.

To perform the conversion process in the preferred embodiment, an address register receives digital data from the controller. A series of video lookup tables converts the 8 bit signal from the address register to 24 bits of data, 8 bits for each gun.

With this processing arrangement, high resolution video data may be transferred at high rates between the controller and the monitor. In the preferred embodiment, the monitor includes a display capable of displaying 1280×1024 pixels in which a new pixel is refreshed every 9.3 nanoseconds.

BRIEF DESCRIPTION OF THE DRAWING

These and other objects and advantages of this invention will become more apparent and more readily appreciated from the following detailed description of the presently preferred exemplary embodiment of the invention taken in conjunction with the accompanying drawing, of which.

DETAILED DESCRIPTION OF THE PRESENTLY PREFERRED EXEMPLARY EMBODIMENT

Figure 1:
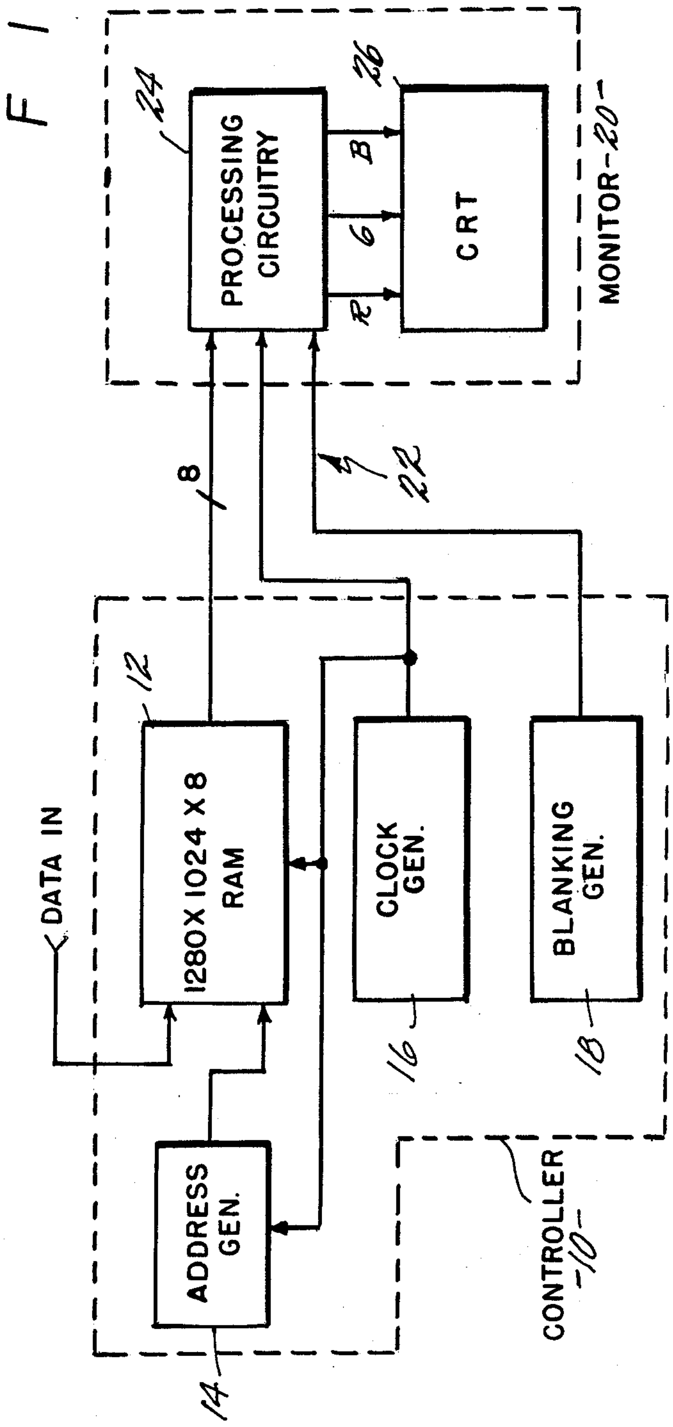
FIG. 1 is a block diagram of the preferred embodiment of the present invention.

In FIG. 1, controller 10 includes memory 12 addressed by address generator 14. In the preferred embodiment, memory 12 is a random access memory (RAM) in a 1280×1024×8 bit configuration. Memory 12 stores data for an image to be displayed. Each of the 1280×1024 pixels in the image are represented by 8 bits of data.

Also included in controller 10 are clock generator 16 which generates clock pulses which control the rate at which data is read out from RAM 12, and blanking signal generator 18 which produces signals related to periods during which all images are to be blanked from a display device.

The output signals from RAM 12, clock generator 16 and blanking signal generator 18 are conducted, in digital form, from controller 10 to monitor 20 over coaxial lines 22. In monitor 20, the digital data from controller 10 are processed by circuitry 24 and then displayed on cathode ray tube 26.

Figure 2:
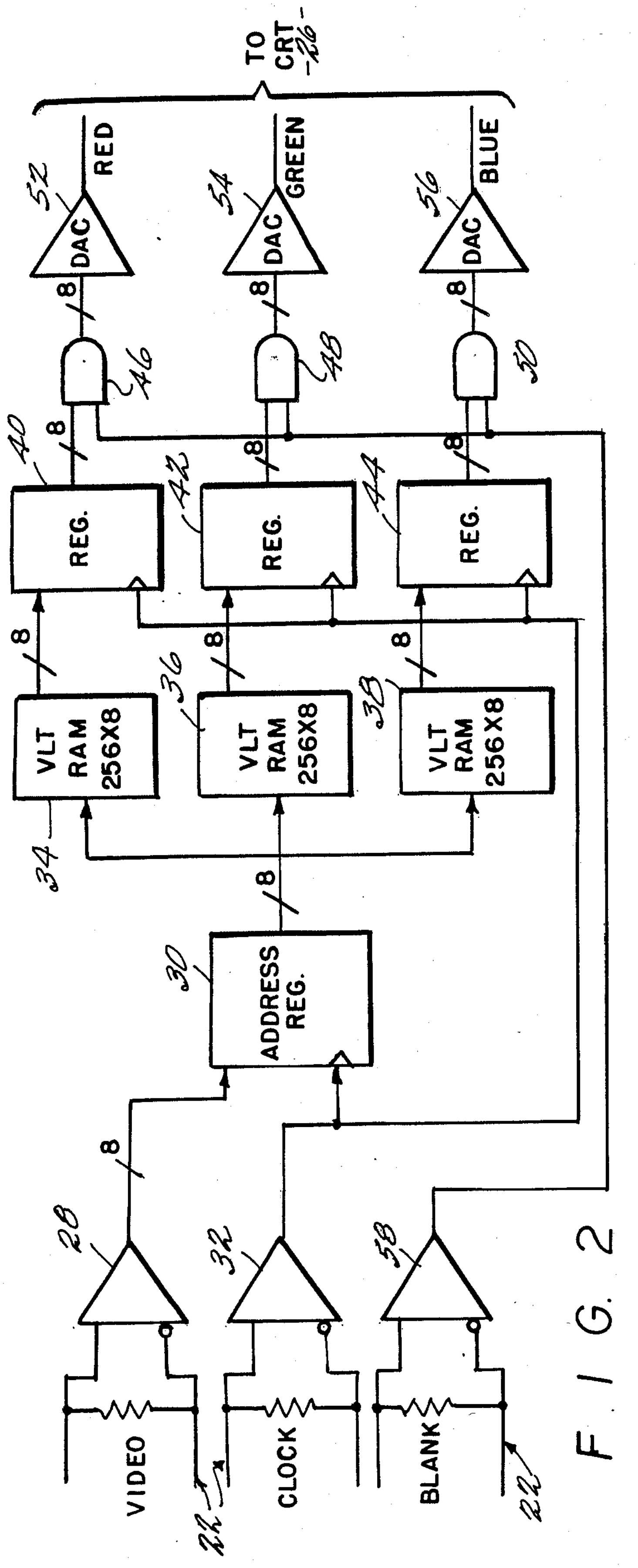
FIG. 2 is a block diagram of the monitor processing circuitry of the preferred embodiment.

FIG. 2 is a block diagram of processing circuitry 24. Eight bits of digital data from RAM 12, having been transmitted over coaxial cable 22 are applied to buffers symbolically depicted as buffer 28. From buffers 28, 8 bits of digital data are applied to address register 30.

Clock signals from clock generator 16 are applied to buffer 32, the output of which is employed to clock video digital data from buffers 28 into address register 30.

Register 30 is referred to as an address register in that the 8 bits of digital data at its output are employed to address video lookup tables 34 through 38. Each of video lookup tables 34 through 38 is a random access memory in a 256×8 bit configuration. Thus, the 8 bits from address register 30 are employed to address any one of 256 locations in each of video lookup tables 34 through 38, causing each video lookup table to output 8 bits of video data stored therein. The digital output signals from video lookup tables 34 through 38 are applied to registers 40 through 44, respectively, which are clocked by signals from buffer 32. The output of registers 40 through 44 are applied through AND gates 46 through 50, respectively, to digital-to-analog converters 52 through 56, respectively. Digital-to-analog converters 52 through 56 produce analog data which are applied to cathode ray tube 26.

Blanking signals from blanking generator 18 are applied to buffer 58. The output of buffer 58 is applied as a second input to AND gates 46 through 50. During periods when no signal should be applied to cathode ray tube 26, blanking signal generator 18 generates a signal which causes AND gates 46 through 50 to prevent signals from registers 40 through 44 from being applied to digital-to-analog converters 52 through 56.

Figure 3:
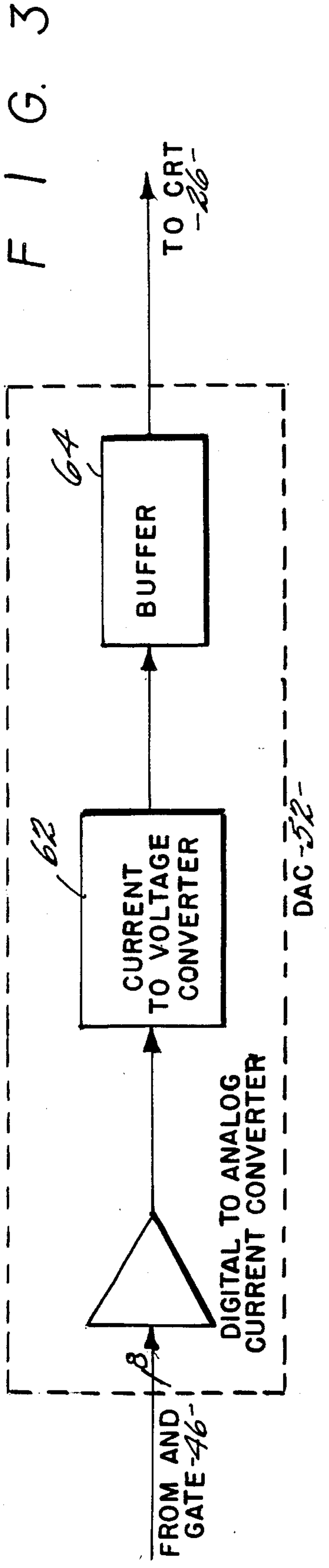
FIG. 3 is a block diagram of the digital-to-analog converter of the present invention.

FIG. 3 is a block diagram of digital-to-analog converter 52. Since digital-to-analog converters 52 through 56 are identical to each other, only digital-to-analog converter 52 will be described in detail. In FIG. 3, digital data from AND gate 46 is applied to digital-to-analog current converter 60. This converts the 8 bits of digital data from AND gate 46 into one of 256 different current levels. These currents are applied to analog current-to-analog voltage converter 62 which generates a voltage related to the current. The output of current-to-voltage converter 62 is applied to buffer 64 which isolates the capacitance of cathode ray tube 26. Thus, the capacitance of a cathode ray tube is typically 20 pf. On the other hand, the capacitance between the base and collector of a transistor as is typically found in buffer 64 is 3 to 8 pf. Buffer 64 provides an output with an impedance lower than that of current-to-voltage converter 62 which is better capable of driving the capacitance of cathode ray tube 26.

The digital data is converted to an analog current prior to being converted to an analog voltage in that it is easier to switch currents than voltages.

To display data stored in RAM 12, address generator 14 addresses sequential memory locations of RAM 12 and the digital data stored in RAM 12 is output over lines 22 to address register 30. After being translated by video lookup tables 34 through 38, the digital data is applied to digital-to-analog converters 52 through 56. As illustrated in FIG. 3, in each digital-to-analog converter, the digital data is first converted to an analog current by digital-to-analog current converter 60. Then, current-to-voltage converter 62 converts the analog current to an analog voltage. The analog voltage is then applied to buffer 64 before being applied to cathode ray tube 26 for display.

Figure 4:
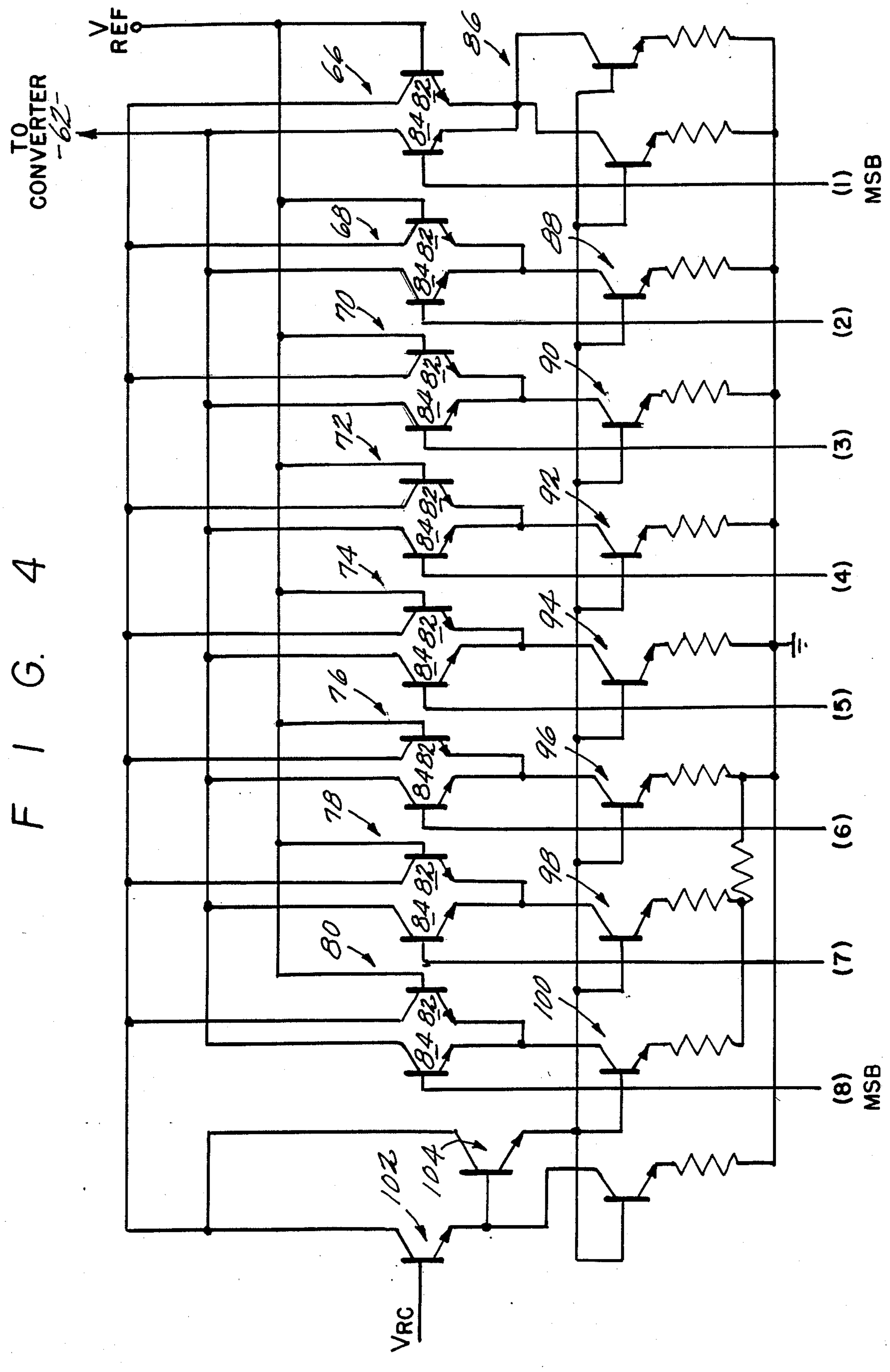
FIG. 4 is a schematic circuit diagram of the digital signal-to-analog current converter of the preferred embodiment.

FIG. 4 illustrates schematically the details of digital-to-analog current converter 60. Converter 60 includes 8 differential amplifiers 66 through 80. Each differential amplifier 66 through 80 includes two transistors 82 and 84 having interconnected emitters. The bases of transistors 82 are connected to a reference voltage. The base of each transistor 84 in each of differential amplifiers 66 through 80 receives one of the 8 bits from AND gate 46. The collector of each transistor 82 is connected to a voltage source, while collectors of transistors 84 are interconnected and provide an output to current-to-voltage converter 62.

As is typical, the emitters of transistors 82 and 84 in each of differential amplifiers 66 through 80 are connected to constant current sources 86 through 100, respectively. Each of constant current sources 86 through 100 includes a transistor connected in series with a resistor which conducts an amount of current related to the significance of the bit of digital data applied to the corresponding differential amplifier. Thus, the most significant bit of data from AND gate 46 is applied to differential amplifier 66. Accordingly, constant current source 86 passes the most current. The second most significant bit of data from AND gate 46 is applied to differential amplifier 68. Constant current source 88 passes half the amount of current of constant current source 86.

The absolute amount of current flowing through each of current sources 86 through 100 is controlled by transistors 102 and 104. The base of transistor 102 receives a signal related to a desired reference current. The degree of conduction of transistor 102 controls the degree of conduction of transistor 104 which provides current to drive the transistors of constant current sources 86 through 100 to a desired degree.

In operation, the digital signal from AND gate 46 is applied to differential amplifiers 66 through 80. In each differential amplifier, either transistor 82 or 84 conducts depending on whether the bit of data applied to transistor 84 is greater or less than the reference voltage applied to the bases of transistors 82. If the bit is a high voltage, then transistor 84 conducts, whereas if the bit is low, transistor 82 conducts and transistor 84 does not conduct. The current flowing between digital-to-analog converter 60 and current-to-voltage converter 62 represents the sum of the currents flowing through transistors 84.

Figure 5:
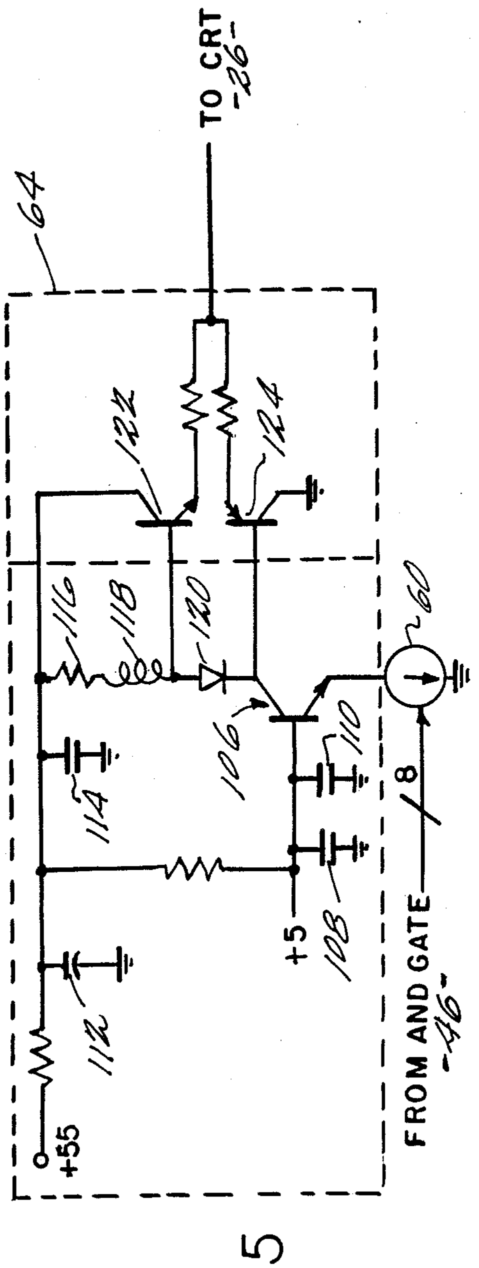
FIG. 5 is a circuit diagram of the current-to-voltage converter and buffer of the preferred embodiment.

FIG. 5 illustrates the details of current-to-voltage converter 62 and buffer 64, and their relationship to schematically illustrated digital-to-analog converter 60. Current-to-voltage converter 62 includes transistor 106 having an emitter connected to the output of digital-to-analog current converter 60. The base of transistor 106 is provided with a constant voltage as filtered by capacitors 108 and 110. A high voltage, as filtered by capacitors 112 and 114, is applied to the collector of transistor 106 through resistor 116, inductor 118 and diode 120. Inductor 118 is a peaking inductor. Since its impedance increases for higher frequency signals, inductor 118 causes the gain of current-to-voltage converter 62 to increase at higher frequencies to compensate for parasitic capacitance which limits high frequency gain.

Buffer 64 converts a first voltage at the collector of transistor 106 to a second voltage applied to CRT 26. Buffer 64 includes a complementary emitter follower arrangement with NPN transistor 122 and PNP transistor 124. The emitters of transistors 122 and 124 are connected together and to CRT 26. The collector of transistor 122 is connected to a voltage source through very little impedance while the collector of transistor 124 is connected to ground. Thus, the output impedance of buffer 64 is extremely low to drive the high capacitance of CRT 26.

The base of transistor 122 is connected to the anode of diode 120, while the base of transistor 124 is connected to the cathode of diode 102. Diode 120 provides a voltage drop which reduces the dead voltage range at which neither transistor 122 nor transistor 124 would conduct if the same signal were applied to the bases of these transistors.

In operation, the degree to which transistor 106 conducts is directly related to the current flowing through digital-to-analog current converter 60. Therefore, the voltages appearing at the anode and cathode of diode 120 are also directly related to the current flowing through converter 60. These voltages are applied to transistors 122 and 124. At the emitters of these transistors a voltage is developed which is employed to control CRT 26.

Although only a single exemplary embodiment of the present invention has been described in detail above, those skilled in the art will readily appreciate that many modifications are possible in the exemplary embodiment without materially departing from the novel teachings and advantages of this invention. Accordingly, all such modifications are intended to be included within the scope of this invention as defined in the following claims.

What is claimed is:

1. A system for processing digital video data to be displayed comprising:

means for converting said digital video data into analog current data;

means for converting said analog current data into analog voltage data, said current-to-voltage converting means including a transistor having power terminals connected in series with said digital-to-current converting means and a base being biased by a constant voltage; and means for displaying said analog voltage data.

2. A system as in claim 1 wherein said displaying means has a resolution of at least 1000×1000 pixels.

3. A system as in claim 2 wherein said displaying means updates a new pixel at least once in every 10 nanoseconds.

4. A system as in claim 1 wherein said digital data to analog current data converting means further comprises:

an address register for receiving and storing said digital data; and a plurality of video lookup tables responsive to the output of said address register, each for generating a set of digital data, said digital-to-current converting means being responsive to the output of said video lookup tables.

5. A system as in claim 1 further comprising:

a first housing in which a source of said digital data is disposed;

a second housing which is separate from said first housing and in which said digital-to-current converting means, said current-to-voltage converting means and said display means are disposed; and means for conducting said digital data from said source in said first housing to said digital-to-current converting means in said second housing.

6. A system for processing digital video data to be displayed comprising:

means for converting said digital video data into analog current data;

means for converting said analog current data into first analog voltage data including: (A) a transistor having power terminals connected in series with said digital-to-current converting means, the base of said transistor being biased by a constant voltage, and (B) a forward biased diode connected in series with said transistor and said digital-to-current converting means;

means for converting said first analog voltage data into second analog voltage data, said voltage-to-voltage converting means having an output impedance less than said current-to-first-voltage converting means and including: (1) an NPN transistor having a base connected to the anode of said diode, a collector adapted for connection to a first voltage source and an emitter connected to said displaying means, and (2) a PNP transistor having a base connected to the cathode of said diode, a collector adapted for connection to another voltage source and an emitter coupled to said emitter of said NPN transistor; and means for displaying said analog voltage data.

7. A system as in claim 6 wherein said displaying means has a resolution of at least 1000×1000 pixels.

8. A system as in claim 7 wherein said displaying means updates a new pixel at least once in every 10 nanoseconds.

9. A system as in claim 6 wherein said digital data to analog current data converting means further comprises:

an address register for receiving and storing said digital data; and a plurality of video lookup tables responsive to the output of said address register, each for generating a set of digital data, said digital-to-current converting means being responsive to the output of said video lookup tables.

10. A system as in claim 6 further comprising:

a first housing in which a source of said digital data is disposed;

a second housing which is separate from said first housing and in which said digital-to-current converting means, said current-to-first-voltage converting means, said first-voltage-to-second-voltage converting means and said display means are disposed; and means for conducting said digital data from said source in said first housing to said digital-to-current converting means in said second housing.

* * * * *